(12) United States Patent
Johansson et al.

(10) Patent No.: US 10,815,024 B2
(45) Date of Patent: Oct. 27, 2020

(54) PACKAGING MATERIAL

(71) Applicant: TETRA LAVAL HOLDINGS & FINANCE S.A., Pully (CH)

(72) Inventors: Hans Johansson, Lomma (SE); Lars Bergholtz, Höganäs (SE); Jens Quist, Bjärred (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 204 days.

(21) Appl. No.: 15/319,449

(22) PCT Filed: Jun. 17, 2015

(86) PCT No.: PCT/EP2015/063562
§ 371 (c)(1),
(2) Date: Dec. 16, 2016

(87) PCT Pub. No.: WO2015/193356
PCT Pub. Date: Dec. 23, 2015

(65) Prior Publication Data
US 2017/0121053 A1      May 4, 2017

(30) Foreign Application Priority Data

Jun. 17, 2014   (EP) ..................................... 14172821

(51) Int. Cl.
*B65D 5/56*     (2006.01)
*B65D 5/42*     (2006.01)
(Continued)

(52) U.S. Cl.
CPC ................ *B65D 5/563* (2013.01); *B31F 1/08* (2013.01); *B32B 3/30* (2013.01); *B32B 15/12* (2013.01);
(Continued)

(58) Field of Classification Search
CPC ...... B65D 5/563; B65D 5/4266; B32B 15/20; B32B 15/12; B32B 3/30; B32B 2439/70;
(Continued)

(56) References Cited

U.S. PATENT DOCUMENTS 1,362,330 A    12/1920   Lange
1,987,225 A    1/1935    Bergstein
(Continued)

FOREIGN PATENT DOCUMENTS

CN    101827754 A    9/2010
CN    104334337 A    2/2015
(Continued)

OTHER PUBLICATIONS

Search Report dated Nov. 14, 2018, by the Russian Patent Office in corresponding Russian Patent Application No. 2016151714/12(082903). (2 pages).
(Continued)

*Primary Examiner* — Michael Zhang
(74) *Attorney, Agent, or Firm* — Buchanan Ingersoll & Rooney PC

(57) ABSTRACT

A bulk-based packaging material is provided, comprising at least one crease line for facilitating folding of the packaging material to a package. The at least one crease line is formed as an imprint on a primary side of the packaging material, and as an embossment on a secondary side of the packaging material, wherein the imprint is formed as an elongated groove having a triangular profile.

15 Claims, 12 Drawing Sheets

(51) Int. Cl.
*B65B 9/10* (2006.01)
*B31F 1/08* (2006.01)
*B65B 57/00* (2006.01)
*B32B 3/30* (2006.01)
*B32B 15/12* (2006.01)
*B32B 15/20* (2006.01)
*B31B 170/20* (2017.01)
*B31F 1/10* (2006.01)
*B31B 50/25* (2017.01)
*B31B 155/00* (2017.01)

(52) U.S. Cl.
CPC ............... *B32B 15/20* (2013.01); *B65B 9/10* (2013.01); *B65B 57/00* (2013.01); *B65D 5/4266* (2013.01); *B31B 50/25* (2017.08); *B31B 2155/00* (2017.08); *B31B 2170/20* (2017.08); *B31F 1/10* (2013.01); *B32B 2307/7244* (2013.01); *B32B 2439/70* (2013.01)

(58) Field of Classification Search
CPC ... B32B 2307/7244; B65B 57/00; B65B 9/10; B31F 1/08; B31F 1/10; B31B 2170/20; B31B 50/25; B31B 2155/00
See application file for complete search history.

(56) References Cited

U.S. PATENT DOCUMENTS

| | | | |
|---|---|---|---|
| 3,158,073 A | 11/1964 | Rumberger | |
| 4,715,847 A | 12/1987 | Focke et al. | |
| 5,533,956 A | 7/1996 | Komarek et al. | |
| 6,007,470 A | 12/1999 | Komarek et al. | |
| 2004/0011688 A1* | 1/2004 | Ishikawa | B65B 9/20 206/431 |
| 2004/0259709 A1* | 12/2004 | Guidotti | B65D 5/4266 493/356 |
| 2006/0040816 A1* | 2/2006 | Gordon | B31F 1/08 493/59 |
| 2008/0314536 A1* | 12/2008 | Peng | D21H 27/38 162/129 |
| 2011/0301011 A1 | 12/2011 | Ishikawa et al. | |
| 2012/0114959 A1* | 5/2012 | Larsson | D21H 19/385 428/511 |
| 2014/0291180 A1* | 10/2014 | Lutzig | B65D 5/4266 206/245 |
| 2015/0013278 A1* | 1/2015 | Durand | B65D 5/0005 53/484 |

FOREIGN PATENT DOCUMENTS

| | | | | |
|---|---|---|---|---|
| DE | 10 2008 060 073 A1 | 6/2010 | | |
| EP | 0 187 323 A1 | 7/1986 | | |
| JP | S50-143919 U | 11/1975 | | |
| JP | S58-055014 U | 4/1983 | | |
| JP | H09-507463 A | 7/1997 | | |
| JP | 2003-502174 A | 1/2003 | | |
| JP | 2005-507348 A | 3/2005 | | |
| JP | 2013-064222 A | 4/2013 | | |
| JP | 2013-159405 A | 8/2013 | | |
| WO | 94/12328 A1 | 6/1994 | | |
| WO | WO-9412328 A1 * | 6/1994 | ......... | B05B 11/0037 |
| WO | 00/76759 A1 | 12/2000 | | |
| WO | 03/037729 A1 | 5/2003 | | |
| WO | 2008/076056 A1 | 6/2008 | | |
| WO | 2009/131496 A1 | 10/2009 | | |
| WO | WO-2009131496 A1 * | 10/2009 | ............. | B65D 65/40 |
| WO | WO-2013117852 A1 * | 8/2013 | ........... | B65D 5/0005 |
| WO | 2013/171019 A1 | 11/2013 | | |

OTHER PUBLICATIONS

The extended European Search Report dated Dec. 3, 2014, by the European Patent Office in corresponding European Patent Application No. 14172821.2-1708. (6 pages).

International Search Report (Form PCT/ISA/237) and the Written Opinion of the International Searching Authority (Form PCT/ISA/237) dated Jul. 22, 2015, by the European Patent Office in corresponding International Application No. PCT/EP2015/063562. (9 pages).

An English Translation of the Office Action (Notification of the First Office Action) dated Apr. 26, 2018, by the State Intellectual Property Office (SIPO) of the People's Republic of China in corresponding Chinese Patent Application No. 201580032741.0. (2 pages).

Office Action (Notification of Reasons for Refusal) dated Apr. 16, 2019, by the Japanese Patent Office in corresponding Japanese Patent Application No. 2016-573944 and an English Translation of the Office Action. (14 pages).

Office Action (First Examination Report) dated Mar. 13, 2020, by the Intellectual Property India in corresponding India Patent Application No. 201647043021 and an English Translation of the Office Action. (7 pages).

* cited by examiner

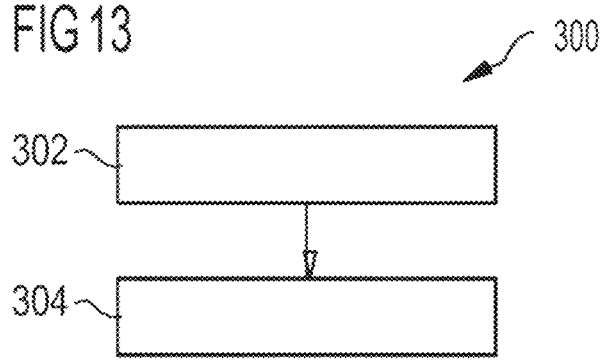

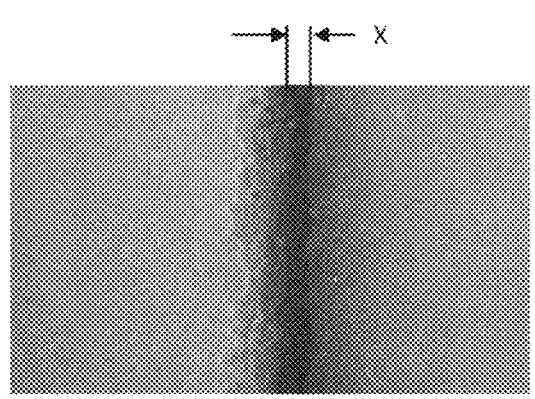
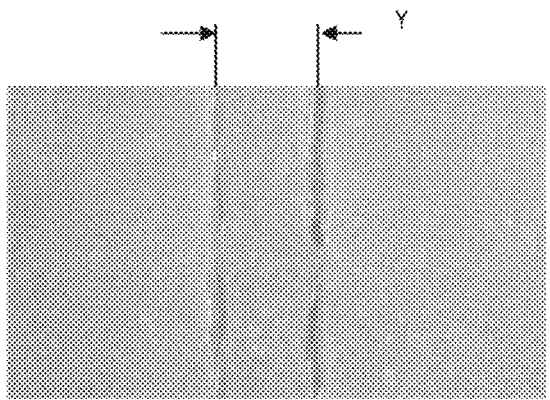
Fig. 14a  Fig. 14b
Fig. 15a
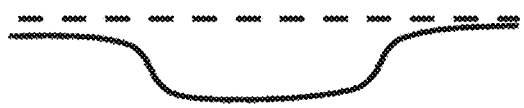
Fig. 15b

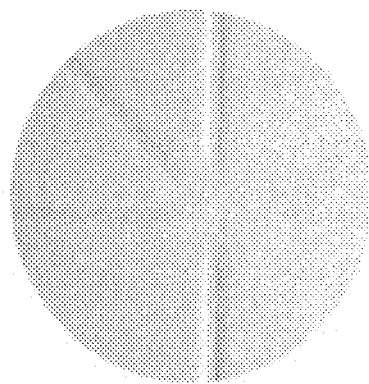
Fig. 18a
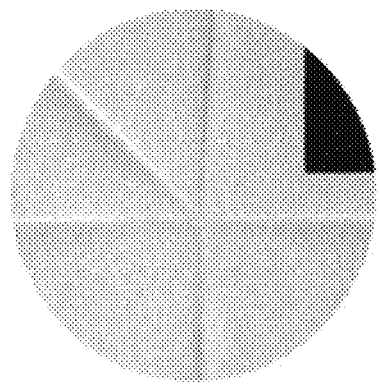
Fig. 18b
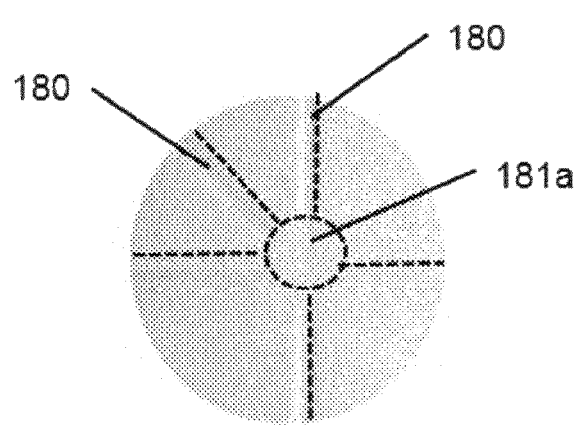
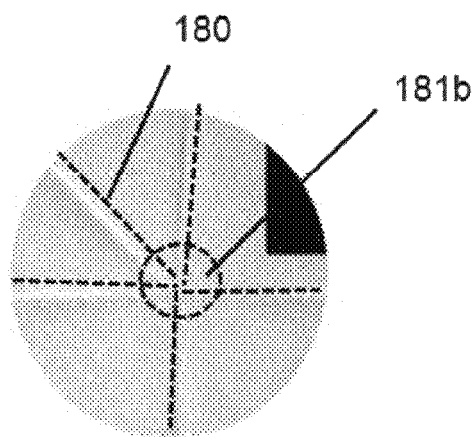
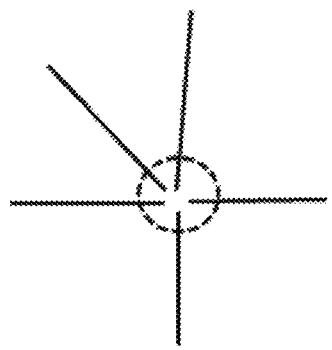
Fig. 18c

PACKAGING MATERIAL

TECHNICAL FIELD

The present invention relates to a packaging material. More particularly, the present invention relates to an improved packaging material having a bulk layer, e.g. a laminated carton-based packaging material used for liquid food packaging.

BACKGROUND

Within packaging technology, use is often made of packages of single use disposable type, and a very large group of these so called single use disposable packages is produced from a laminated sheet or web shaped packaging material comprising a relatively thick bulk layer, e.g. paper or paperboard, and outer liquid tight coatings of plastic. In certain cases, in particular in conjunction with especially perishable and oxygen gas sensitive products, the packaging material also includes an aluminum foil in order to impart to the packages superior gas and light barrier properties.

Within food packaging, and especially within liquid food packaging, prior art single use packages are most generally produced with the aid of modern packaging and filling machines of the type which both forms, fills and seals finished packages from the sheet- or web shaped packaging material. Such method includes a first step of reforming the packaging material into a hollow tube. The tube is thereafter filled with the pertinent contents and is subsequently divided into closed, filled package units. The package units are separated from one another and finally given the desired geometric configuration and shape by a forming operation prior to discharge from the packaging and filling machine for further refinement process or transport and handling of the finished packages.

In order to facilitate the reforming of the packaging material into shaped packages the packaging material is provided with a suitable pattern of material weakening lines or crease lines defining the folding lines. In addition to facilitating folding the crease lines when folded also contribute to the mechanical strength and stability of the final packages; the packages may thus be stacked and handled without the risk of being deformed or otherwise destroyed under normal handling. Further to this the crease lines may also allow specific geometries and appearances of the packages.

Some different methods for providing crease lines have been proposed. For example, a method is known performing the step of introducing the packaging material in a nip between two driven rollers. One of the rollers is provided with a pattern of crease bars, while the other roller is provided with a corresponding pattern of recesses.

In the above-mentioned methods the packaging material is forced between rigid bars/recesses of pressing rollers. The packaging material will consequently be exposed to considerable stresses whereby it may be partly disintegrated and thereby weakened.

The crease bars and the recesses will induce increased stress in the packaging material especially at positions where the packaging material is arranged in close proximity with the vertical edges of the bar, i.e. the edges defining the width of the bar. Each bar/recess will thus give rise to a crease line having two zones of increased stress or shear fracture initiations; the zones extending along the crease line and being separated by a body of material, the width of the body being approximately the same as the width of the bar.

The internal stress of this kind of two-zone crease line will cause the folded packaging material to some extent be biased to return to its original unfolded shape. This is due to the following mechanisms.

The packaging material will be folded along two parallel fracture initiation lines, or extended fracture zones, placed at a distance from each other. The body of material between the fracture initiation lines/zones turns into a larger fracture when folded, which often results in merging of the initial fracture zones. This then forms a double acting hinge with two axes of rotation. The folding can be symmetric with respect to the two fracture lines but is most often asymmetric with respect to the one or the other line. Since folding can occur with equal probability at both fracture initiation lines (axes of rotation), circumstances decide along which line the packaging material will be non-symmetrically folded. Thus, the packaging material may be folded along a first fracture initiation line at some parts of the crease line and then switch over to be folded along the other line and back again, Such unpredictable and inexact folding will result in a less than desired distinct fold on a folded package. The folded edges and corners will be rounded and broad rather than sharp and perpendicular and will sag and tend to flatten out when forces are applied to the side walls adjacent the edge.

Furthermore, during folding of the packaging material the crease line will be compressed on the inside, leading to accumulation of material and the formation of a body of deformed or delaminated material. The body has a lateral extension between the two shear fracture initiation lines, while it extends longitudinally along the entire crease line.

The body of deformed material will consequently be arranged at the centre of the folding. As elasticity of the bulk material remains substantially intact, intrinsic forces of the bulk material may strive to return to its idle position, i.e. to an unfolded condition. These intrinsic forces contribute to cause the folded edges to be less distinct; the sharp edge of a package edge being replaced by a small radius. The folded edges will therefore be less robust and they may sag upon the application of external forces. A package resulting from such folded packaging material will consequently be experienced as having low grip stiffness.

In view of the above there is a need for an improved packaging material overcoming the above mentioned drawbacks.

SUMMARY

An object of the present invention is therefore to provide a packaging material overcoming the above-mentioned disadvantages.

An idea of the present invention is to provide a packaging material having crease lines, each crease line having only one apparent zone of increased shear stress and thus, induced strain. This means that the crease line, upon folding, will create a fracture forming a continuous hinge mechanism having a single axis of rotation.

According to a first aspect, a packaging material having a bulk layer is provided. The packaging material comprises at least one crease line for facilitating folding of the packaging material to a package, the at least one crease line is formed as an imprint on a primary side of said packaging material, and as an embossment on a secondary side of said packaging material, wherein said imprint is formed as an elongated groove having a triangular profile.

According to an embodiment, each crease line which is intended to facilitate one folding operation has only one single fracture initiation line.

According to an embodiment, the packaging material has a fibrous bulk layer, such as comprising one or more homogeneous fibre layers. According to an embodiment, the fibrous layer has a density higher than 300 kg/m$^3$ and a bending stiffness index of from 6.0 to 24.0 Nm$^6$/kg$^3$, according to method ISO 2493-1 and SCAN-P 29:95 (equivalently 0.5 to 2.0 Nm$^7$/kg$^3$), calculated as a geometric mean value for machine and transverse direction.

According to another embodiment, the crease lines have a thickness reduction of the imprinted or embossed packaging material, compared to uncreased material, of from 5% to 25%, such as from 10 to 25%.

According to a further embodiment, the packaging material forms, when folded, a fracture (54) along the crease lines, the width of the fracture being less than two times the thickness of the packaging material (2), calculated as an average of at least 20 different measurements. The triangular profile may for some embodiments be symmetrical along a center line extending from a bottom apex in the normal direction of said packaging material. In other embodiments the triangular profile is non-symmetrical along a center line extending from a bottom apex in the normal direction of said packaging material.

The triangular profile may extend from a first side of the primary side to a second side of the primary side via said apex, and wherein the vertical distance between the first side and the apex is equal to the vertical distance between the second side and the apex.

In other embodiments the triangular profile extends from a first side of the primary side to a second side of the primary side via said apex, and wherein the vertical distance between the first side and the apex is different from the vertical distance between the second side and the apex.

In some embodiments the primary side of said packaging material is configured to form the interior side of a package, while in other embodiments the primary side of said packaging material is configured to form the outer side of a package.

The packaging material may further comprise a set of crease lines, wherein at least one crease line is oriented in a first direction for forming a longitudinal fold, and wherein at least one crease line is oriented in a second direction for forming a transversal fold.

At least one crease line may be oriented in a tilted direction relative the first and second directions for forming a diagonal fold corresponding to a corner or a flap of a final package.

The packaging material may further comprise at least one area at which an imprint of a first crease line intersects with an imprint of a second crease line.

The area may be configured to form a corner of a package, and the depth of the imprints at said area may be substantially the same as the depth of the imprints at other positions on the packaging material.

The packaging material may further comprise a readable mark arranged at a fixed position relative at least one crease line.

The packaging material may comprise a laminate having a layer of bulk material being covered by plastic coatings on each side thereof.

According to a second aspect, a continuous web is provided. The web is made of a packaging material according to the first aspect.

According to a third aspect a blanks or a capsule is provided. The blanks or the capsule, being formed as a folded blanks, is made of a packaging material according to the first aspect.

According to a yet further aspect, a packaging container is provided. The packaging container comprises a packaging material according to the first aspect and being folded along said at least one crease line.

It should be noted that the term "packaging material having a bulk layer" should throughout this application be interpreted broadly to cover single layers of bulk layers, such as paper, paperboard, carton, or other cellulose-based material, as well as multi layer laminates comprising at least one layer of bulk material and additional plastic layers. Further to this, the term should also be interpreted to cover laminates including various barriers, such as Aluminum foils, barrier material polymer films, barrier-coated films etc. A "packaging material having a bulk layer" is thus covering material being ready to be used for filling or packaging, as well as material which will be subject to further processing such as lamination before being ready to use for packaging purposes. The bulk layer may be fibrous with homogenous fibre layers, and according to an embodiment such fibrous bulk layers, paperboards or cartons, suitable for the purpose of the invention have a density higher than 300 kg/m$^3$ and a bending stiffness index from 6.6 to 14.1 Nm$^6$/kg$^3$ according to method SCAN-P 29:95 (equivalently 0.5 to 1.2 Nm$^7$/kg$^3$). The bending stiffness index is calculated as a geometric mean value for machine and transverse direction.

The quality of the final package is of great importance, especially when it comes to liquid food packaging and aseptic packages. The packages are subject to very high requirements in order to ensure food safety, while at the same time the packages need to be robust and geometrically well-defined in order to improve storing and handling. The inventors have realized that the dimensional stability of the packages may be improved by using techniques configured to provide sharp edges and corners at the positions of the crease lines. With conventional creasing technology, a deeper imprint provides an improved crease and higher grip stiffness of a package produced with such folded creases. With deeper imprinted crease lines there will, however, be an increased risk of excessive disintegration of the bulk layer of the packaging material and even of cutting it or severely weakening it. In the case where the packaging material is laminated with a thin foil of aluminum acting as a barrier for oxygen, there is also an increased risk of crack formation in the aluminum foil, due to the deeper imprints (or higher embossment protrusions on the non-imprint side of the packaging material) causing air entrapments which make the aluminum foil weaker by being unsupported by adjacent layers.

Therefore this disclosure will present improved methods and systems for providing crease lines to a packaging material, which allows for improved dimensional stability of the final packages without reducing the quality and safety of the final packages.

BRIEF DESCRIPTION OF DRAWINGS

These and other aspects, features and advantages of which the invention is capable will be apparent and elucidated from the following description of embodiments of the present invention, reference being made to the accompanying drawings, in which

FIG. 9b is a side view of a packaging material being subject to the prior art system of FIG. 9a;

FIG. 10b is a side view of a packaging material being subject to the system of FIG. 10a;

FIG. 13 is a schematic view of a method according to an embodiment;

FIG. 14a is a view of a crease line according to the invention, as viewed by a microscope of ×50 magnification, from the decor side, i.e. the outside of the packaging material having a bulk layer;

FIG. 14b is a view of a prior art crease line, as viewed by a microscope of ×50 magnification, from the decor side, i.e. the outside of the same type of packaging material having a bulk layer;

FIG. 15a shows schematically the cross-sectional profile of the crease line of the invention of FIGS. 10a-c, as evaluated by a Creasy instrument;

FIG. 15b shows schematically the cross-sectional profile of the prior art crease line of FIGS. 9a-d, as evaluated by a Creasy instrument;

FIG. 18a is a picture taken by a magnifying camera lens, of the flat, not yet folded, prior art packaging material at a corner area of a Tetra Brik package;

FIG. 18b is a picture taken by a magnifying camera lens, of the flat, not yet folded, packaging material, creased according to the method of the invention, at a corner area of a Tetra Brik package; and FIG. 18c is a schematic illustration of the meaning of substantially intersecting crease lines of the invention, i.e. almost intersecting crease lines, i.e. crease lines almost connecting to an intersection point such that they will automatically propagate and then intersect upon folding.

DETAILED DESCRIPTION

Figure 1:
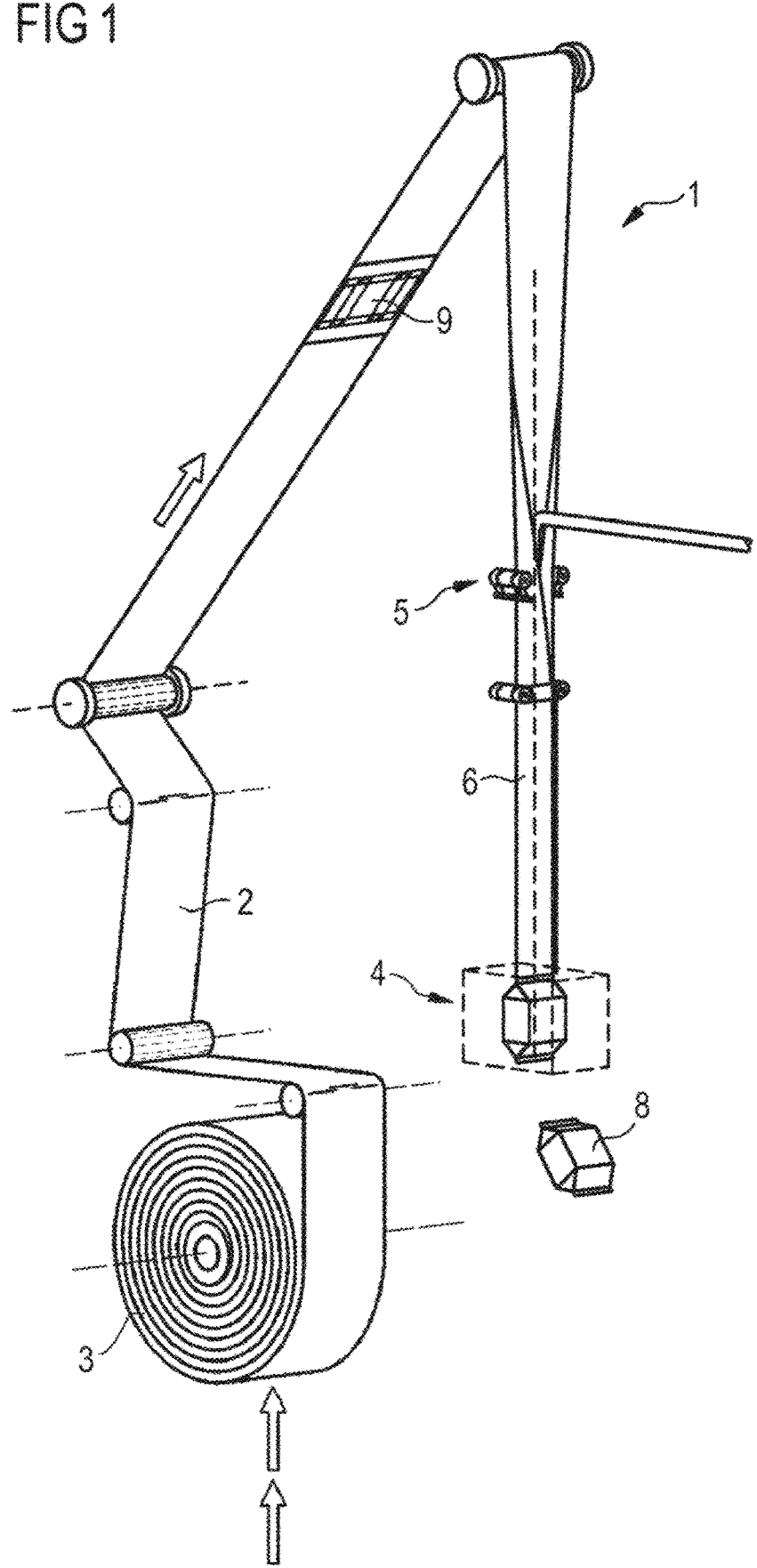
FIG. 1 is a schematic view of a filling machine for providing individual packages.

Packaging material having a bulk layer may be used in many different applications for providing cost-efficient, environmentally friendly, and technically superior packages for a vast amount of products. In liquid product packaging, e.g. in liquid food packaging, a carton-based packaging material is often used for forming the final individual packages. The carton-based packaging material is configured to be suitable for liquid packaging and has according to an embodiment, certain properties adapted for the purpose. The packaging material thus has a bulk layer of a carton that fulfils the requirements to provide stiffness and dimensional stability to a packaging container produced from the packaging material. The cartons normally used are thus fibrous paperboards, i.e. fiberboards having a bulk of a network structure of cellulose fibres, with suitable density, stiffness and capability of resisting possible exposure to moisture. Non-fibrous cellulose-based cartons, on the other hand, of the type corrugated paperboard or honey-comb or cellular paperboards, are so-called structural paperboards and are not suitable for the purpose of this invention. Such structural paperboards are folded and provided with weakening lines for folding by different mechanisms, than the present invention. They are constructed according to the I-beam principle wherein a structural middle layer (e.g. corrugated, honey-comb, cellular foam) is sandwich-laminated between thin flanges of paper layers. Due to the in-homogeneous nature of a structural middle layer, the outer flanges are joined to such a structure middle layer only at restricted areas or points, and not joined to it over their entire surfaces. With such bulk layers, a weakening line may be produced by simply collapsing the structural middle layer by pressing the sandwich bulk material together along a line, such that empty internal spaces (such as foam cells, honey-comb cells or the areas between the corrugated wave pattern), are compacted and eliminated from the structure along those weakening lines. In particular, the fibrous type of bulk layers or cartons or paperboards applicable to packaging materials and methods of this invention, are thus fibrous structures from homogeneous fibre layers, which advantageously also are configured in an I-beam or sandwich arrangement, however with the respective middle layer and flanges being tied to each other over their entire surfaces facing each other. Typical fibres usable for the fibrous bulk are cellulose fibres from chemical pulp, CTMP, TMP, kraft pulp or the like. According to an embodiment, the fibrous bulk layers, paperboards or cartons, suitable for the purpose of the invention have a density higher than 300 kg/m$^3$ and a bending stiffness index from 6.0 to 24.0 Nm$^6$/kg$^3$, according to method ISO 2493-1 and SCAN-P 29:95 (equivalently 0.5 to 2.0 Nm$^7$/kg$^3$). The bending stiffness index is calculated as a geometric mean value for machine and transverse direction.

FIG. 1 shows an example of such a system, i.e. a general setup of a filling machine 1 used for filling liquid food product into individual carton-based packages 8. The packaging material may be provided as single sheets for creating individual packages in a filling machine, or as a web of material 2 which is fed into a filling machine as is shown in FIG. 1. The web of packaging material 2 is normally distributed in large rolls 3 of which the filling machine is configured to feed the packaging material 2 through various treatment stations, such as sterilizers, forming sections 4, filling sections 5, and distribution sections of the filling machine.

The packaging material 2 may be formed into an open ended tube 6. The tube 6 is arranged vertically in the filling machine 1 and is subject to continuous filling as the packaging material is transported through the filling machine. As the packaging material 2, and thus the tube 6, is moving transversal seals are provided for forming individual packages of the tube. Each package is separated from the tube by a sealing and cutting tool operating to provide a transversal seal and a corresponding cut in the sealing area, and the individual packages 8 are transported for allowing subsequent packages to be separated from the tube.

The forming section 4 may also be configured to fold parts of the individual packages e.g. in order to form flaps, planar ends, etc. As can be seen in FIG. 1 the forming section 4 is capable of rearranging the cylindrical shape of the tube 6 into a rectangular, or cuboid or box-like body having two closed ends. Such re-shaping is provided by folding the sealed part of the tube 6 along predefined crease lines 9.

The crease lines 9 are provided during manufacturing of the packaging material. In some embodiments the crease lines are provided directly to a carton layer before lamination, while in some embodiment the crease lines are provided to the packaging material after lamination of the carton layer.

Hence the filling machine 1 receives packaging material 2 already provided with crease lines 9. It should however be realized that the systems for providing crease lines described below may be implemented also as a creasing section within a filling machine.

Figure 2A:
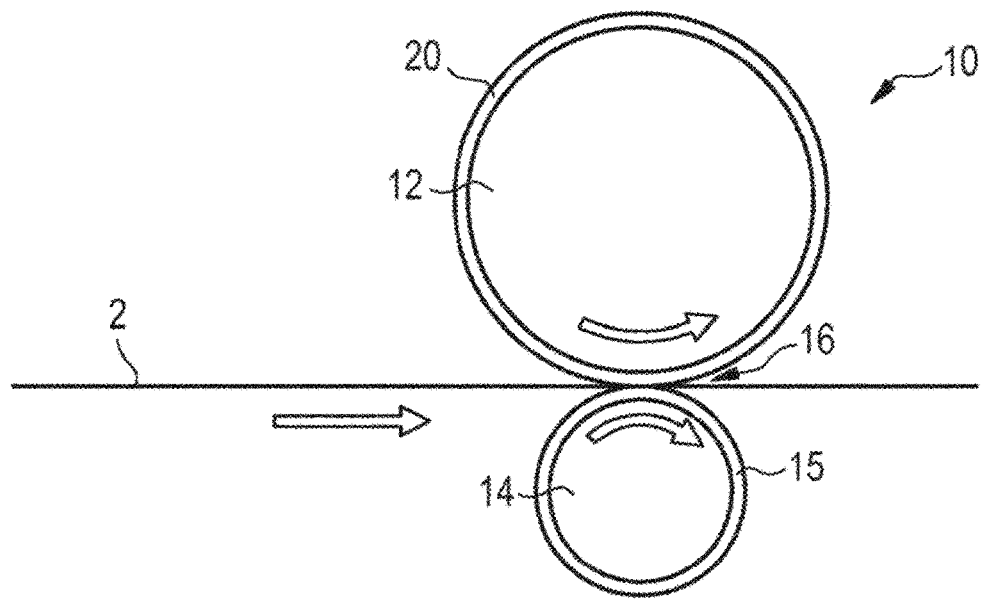
FIG. 2*a* is a side view of system for providing crease lines according to an embodiment.
Figure 2B:
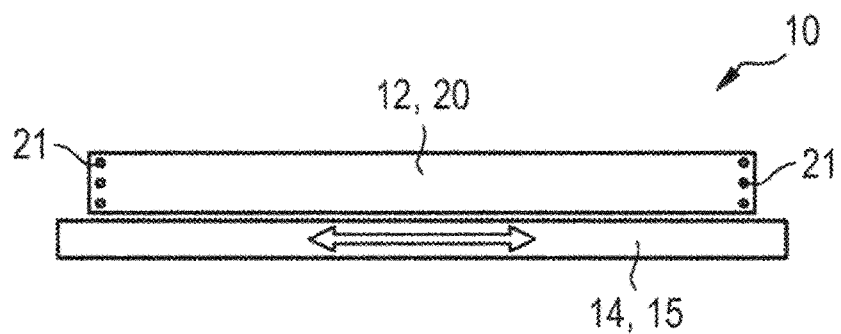
FIG. 2*b* is a front view of the system shown in FIG. 2*a*.

Now turning to FIG. 2a-b an embodiment of a system 10 for providing crease lines to a packaging material having a bulk layer is shown. The system 10 comprises a crease line pressing tool 12 in the form of a pressing tool roller, and an anvil 14 in the form of an anvil roller. At least one of the rollers 12, 14 are driven such the packaging material 2 may be fed into and passing through a nip 16 formed between the rollers 12, 14. As is shown in FIG. 2a, the packaging material 2 may for this embodiment preferably be provided as a web thus allowing continuous operation of the system 10.

The pressing tool 12 is provided with a plate 20 covering at least a part of the outer periphery of the pressing tool roller 12. The plate 20 may e.g. be a metal body which may be curved in order to adapt to the cylindrical shape of the roller 12, or the plate 20 may be formed by a plurality of curved segments which together form an outer shell of the roller 12.

The plate 20 comprises at least one protrusive ridge 22 (see e.g. FIGS. 6-8) extending in a normal direction, i.e. radially outwards towards the anvil roller 14.

The anvil 14 forms a roller having an outer layer 15 of elastic material being reversibly deformable, such as a material composition comprising a rubber or a polymer having elastomeric properties. Preferably the elastic material is covering the entire surface of the roller 14 being in contact with the packaging material to be creased. The elastic material may e.g. be a rubber-material having a thickness of approximately 2-50 mm and having a hardness of from 70 shore A to 80 shore D, e.g. 60 Shore D or 95 Shore A.

Preferably the diameter of the pressing tool roller 12 is not the same as the diameter of the anvil roller 14. As is shown in FIG. 2a the anvil roller 14 has a smaller diameter than the pressing tool roller 12, however the anvil roller 14 could have a larger diameter than the pressing tool roller 12 in some embodiments. By providing different diameters of the rollers 12, 14 the ridges of the pressing tool plate 20 will not impact the same positions of the anvil roller 14 during operation, whereby increased durability of the anvil roller 14 is ensured. It is thus understood that in a most preferred embodiment the diameter of one of the rollers 12,14 is different than the diameter of the other roller 12, 14, as well as being different from any multiples of the circumference of the other roller.

FIG. 2b shows a front view of the system 10 of FIG. 2a. The pressing tool plate 20 is provided with means 21 for attaching the plate 20 to the pressing tool roller 12; the means 21 may e.g. be provided as through holes which may be aligned with threaded bores in the roller 12 such that screws or similar fasteners may be used to secure the plate 20 to the roller 12. The means 21 are for example provided at the lateral ends of the plate 20.

At least one of the rollers 12, 14 may be supported while allowing lateral displacement during operation. In FIG. 2b the anvil roller 14 is shown to be displaceable whereby lateral position may be shifted for ensuring that the ridge of the plate 20 does not impact at the same lateral position on the anvil roller 14. Means (not shown) is provided, such as linear stages, electrical motors or similar, in order to allow lateral movement of one, or both of the rollers 12, 14.

Figure 3:
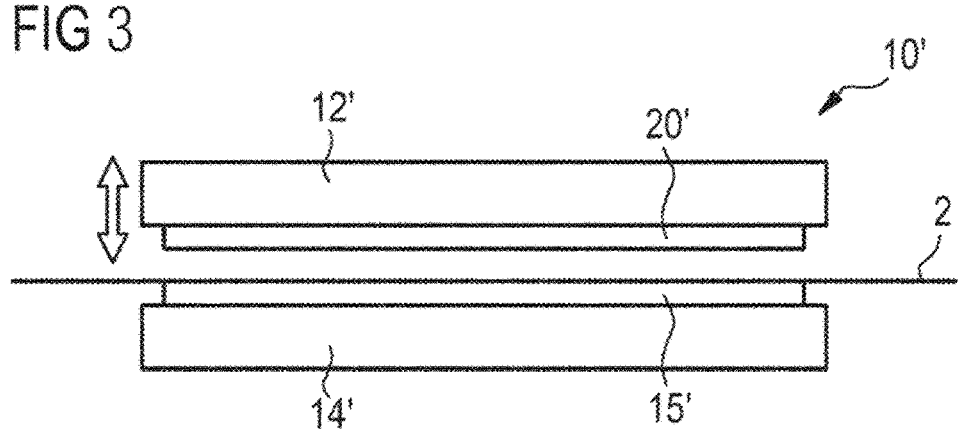
FIG. 3 is a side view of a system for providing crease lines according to a further embodiment.

In FIG. 3 a further embodiment of a system 10' for providing crease lines to a packaging material having a bulk layer is shown. Similarly to what has been described with reference to FIGS. 2a-b the system 10' comprises a pressing tool 12' and an anvil 14'. However, for this embodiment the system 10' is implemented as a flat bed punch whereby the pressing tool 12' is provided as a frame-like structure which may be raised and lowered relative the anvil 14, also in the form of a frame-like structure. The pressing tool 12' comprises a planar plate 20' having at least one protrusive ridge 22 (see e.g. FIGS. 6-8) extending in a normal direction, i.e. towards the anvil roller 14'. The anvil 14' is correspondingly provided with an elastic layer 15'. When a packaging material having a bulk layer 2 is arranged between the pressing tool 12' and the anvil 14' the pressing tool 12' may be controlled to be lowered and pressed against the anvil 14'—the ridges of the plate 20' will thus provide an imprint on the packaging material, which imprint forms a crease line for later folding.

Figure 4:
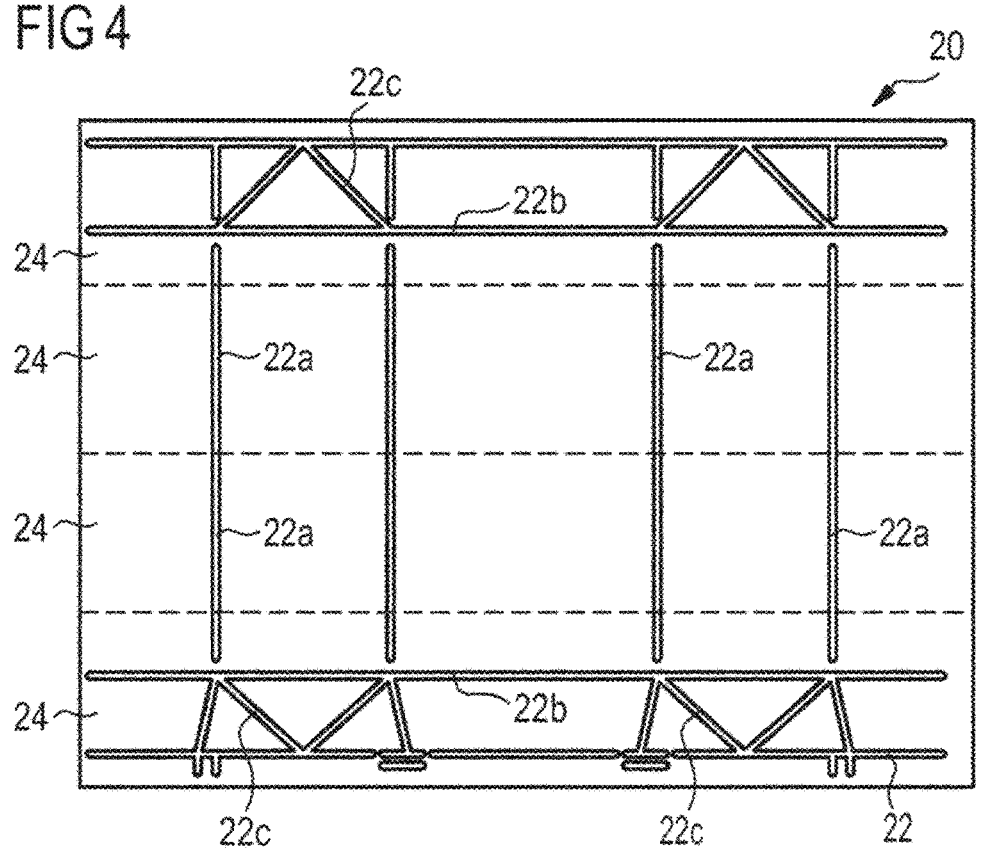
FIG. 4 is a top view of a crease line pressing tool according to an embodiment.

Now turning to FIG. 4 a plate 20 is shown. The plate 20 is provided with several ridges 22, wherein each one of the ridges 22 is formed as a protrusion extending away from the surface of the plate 20. The plate 20 shown in FIG. 4 is constructed to form crease lines which may be used to facilitate folding of one individual package. Longitudinal ridges 22a will form crease lines used to reshape a cylindrical tubular body to a rectangular, or cuboid or box like, body. Transversal ridges 22b will form crease lines used to reshape the ends of the rectangular body into planar surfaces, and diagonal ridges 22c are provided to form crease lines which will allow folding of flaps.

Should the plate 20 be mounted onto a pressing tool roller 12 the plate 20 may be divided into several segments 24, each segment forming a part of the periphery of the roller 12. The plate 20 may be constructed to comprise ridges necessary to form the crease lines of one individual package. However, the plate 20 may comprise ridges 22 used to form crease lines of multiple packages. In such embodiment the plate 20 shown in FIG. 4 may be extended in any direction (laterally in case of wider packaging material, longitudinally in case of larger diameter of the roller). In some embodiments the plate 20 may be provided as a sleeve arranged to cover the outside surface of the roller 12.

Figure 5:
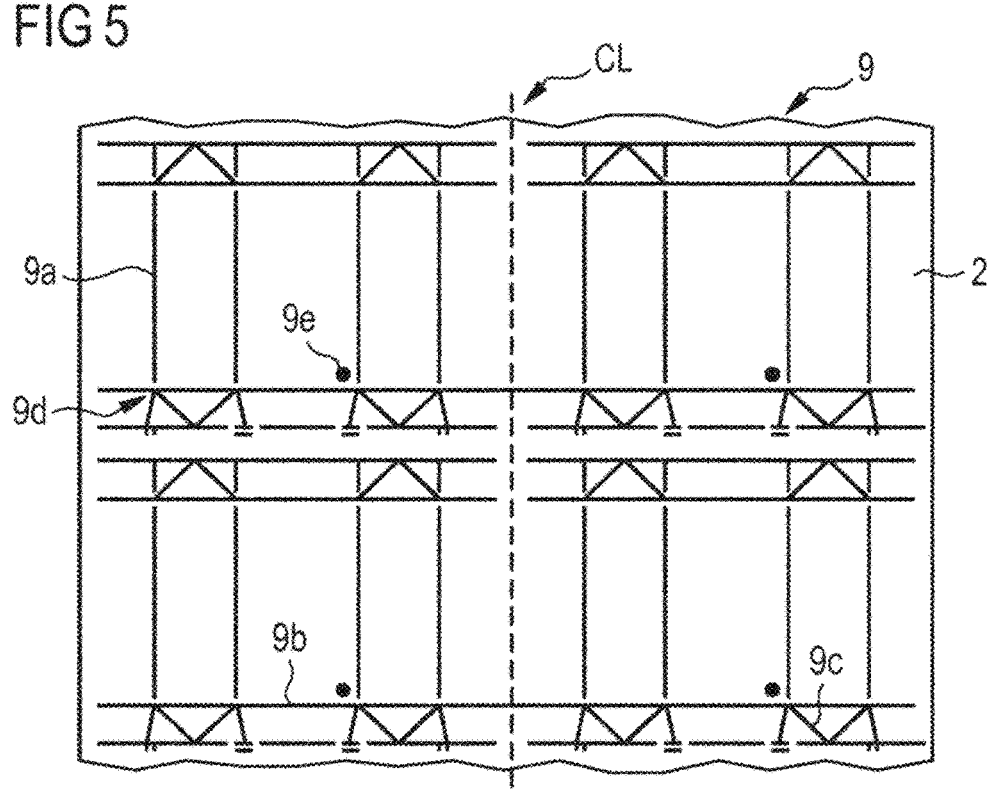
FIG. 5 is a top view of a part of a web of packaging material.

FIG. 5 shows an example of a portion of a packaging material 2 having a set of crease lines 9 provided by means of a plate 20. The crease lines 9 representing several package repeat lengths, i.e. patterns corresponding to a packaging container each, are arranged relative one or more cutting lines CL, whereby the packaging material 2 may be cut along the cutting line CL for forming two or more individual rolls of packaging material before filling and/or folding. Thus, the creasing operation may be performed on a wide web of paperboard or packaging material, which then is divided into single package repeat length webs, having the width of one package only, by cutting or slitting along the machine direction of the web. When comparing the set of crease lines 9 of the packaging material 2 with the ridges 22 of the plate 20 shown in FIG. 4 it is obvious that the ridge pattern of the plate 20 is transferred to the packaging material 2. Hence the packaging material 2 comprises longitudinal crease lines 9a which will assist for reshaping a cylindrical tubular body to a rectangular, or cuboid or box like, body. Transversal crease lines 9b will assist for reshaping the ends of the rectangular body into closed bottom and top surfaces, according to some embodiments being planar, and diagonal crease lines 9c are provided to assist for folding of flaps.

The crease lines 9 may according to one embodiment be provided on only one side of the packaging material 2, i.e. on the side which will form the outside of the final package. According to another embodiment, they may be provided on the side which will form the inside of the final package. In yet further embodiments one or more crease lines 9 may be provided on one side of the packaging material, while one or more crease lines 9 may be provided on the opposite side of the packaging material. Each crease line has only one fracture initiation line and each crease line 9 on the packaging material in FIG. 5 corresponds to one protrusive ridge 22 on the pressing tool in FIG. 4.

Now turning to FIGS. 6-8 different embodiments of the ridge 22 will be described. As already mentioned the ridge 22 is formed as a protrusion extending away from a planar surface of the pressing tool plate 20. The protrusion has a length, i.e. is extended in a direction corresponding to the direction of the folding line to be formed onto the packaging material, as well as a width, i.e. an extension in a direction perpendicular to the length direction and in parallel with the plane of the plate 20. Further to this the ridge 22 also has a height whereby the three-dimensional shape of the ridge 20 will be transferred as an imprint into the packaging material.

As will be understood from the following description of various embodiments of a ridge 22, all embodiments will provide an imprint due to a pressing action in which the ridge 22 is pressed into the packaging material, such that the width of the imprint is continuously increasing as the ridge 22 is pressed against the anvil. For this purpose the ridge 22 comprises a base portion 25 and an imprint portion 26, wherein the width of the imprint portion 26 is continuously decreasing from the base portion 25 to an apex 27. In general, the imprint portion 26 should throughout this description be interpreted as the part of the ridge 22 which is actually providing the imprint into the packaging material 2; i.e. the part of the ridge 22 being in contact with the packaging material 2 during the creasing process.

Figure 6A:
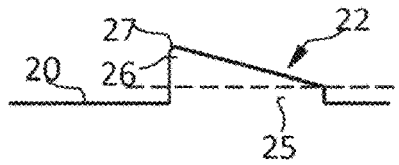
FIGS. 6a-f are cross-sectional views of a ridge of a crease line pressing tool according to various embodiments.

Starting with FIG. 6a an embodiment of a ridge 22 is shown. The ridge 22 has an imprint portion 26 extending from a base portion 25; the base portion 25 is arranged adjacent to, and as an extension of, the surface of the plate 20 (not shown). The height of the ridge 22, i.e. the total height of the imprint portion 26 and the base portion 25, is approximately 3 mm, while the width of the ridge 22 is approximately 4 mm. The apex 27 is rounded by a radius of approximately 0.2 mm, and the angle at the apex 27 is approximately 75°. During operation it has been found that the deflection of the elastic anvil will be approximately 0.5 mm at the position where maximum creasing is provided, i.e. maximum indentation into the elastic anvil, i.e. at the position of the apex 27 of the ridges 22. The height of the imprint portion 26 is preferably slightly larger than 0.5 mm, such as in the range of 1-1.5 mm.

Figure 6B:
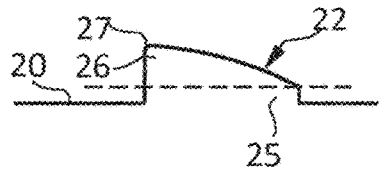

FIG. 6b shows another embodiment of a ridge 22. The ridge 22 has an imprint portion 26 extending from a base portion 25; the base portion 25 is arranged adjacent to, and as an extension of, the surface of the plate 20. The height of the ridge 22 is approximately 3 mm, while the width of the ridge 22 is approximately 4 mm. The apex 27 is rounded by a radius of approximately 0.2 mm, and the angle at the apex 27 is approximately 75°. The ridge 22 forms a convex shape, such that the tilted surface from the apex 27 is curved. The height of the imprint portion 26 may be 1-1.5 mm.

Figure 6C:
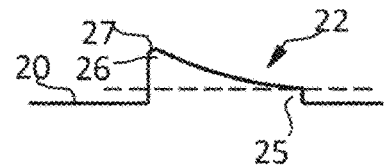

A similar embodiment is shown in FIG. 6c, however the convex shape is replaced by a concave shape. The height of the ridge 22 is approximately 3 mm, while the width of the ridge 22 is approximately 4 mm. The apex 27 is rounded by a radius of approximately 0.2 mm, and the angle at the apex 27 is approximately 75°. The height of the imprint portion 26 may be 1-1.5 mm.

Figure 6D:
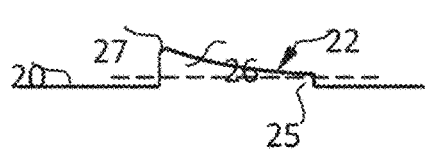

In FIG. 6d a further embodiment of a ridge 22 is shown. The height of the ridge 22 is approximately 3 mm, while the width of the ridge 22 is approximately 4 mm. The apex 27 is rounded by a radius of approximately 0.2 mm, and the angle at the apex 27 is approximately 60°, however decreasing rapidly to approximately 80°. The height of the imprint portion 26 may be 1-1.5 mm.

Figure 6E:
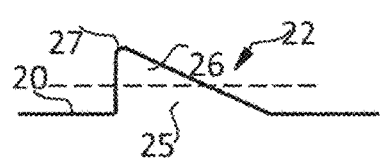
Figure 6F:

FIGS. 6e and 6f show further embodiments of a ridge 22 being similar to the embodiment shown in FIG. 6a. However in FIG. 6e the angle at the apex 27 is approximately 65°, and in FIG. 6f the angle at the apex 27 is approximately 55°. The height of the imprint portion 26 may be 1-1.5 mm.

FIGS. 7a-i show other embodiments of a ridge 22, having an imprint portion 26 extending from a base portion 25 to an apex 27. For all embodiments the height of the imprint portion 26 is approximately 1.5 mm. The dimensions of the imprint portion 26 are given below, for which $d_1$ is the angle between a horizontal plane and the extension of one of the sides of the triangular shape (see FIG. 7a), $d_2$ is the angle at the apex 27, and $d_3$ is the radius of the apex 27.

Figure 7A:
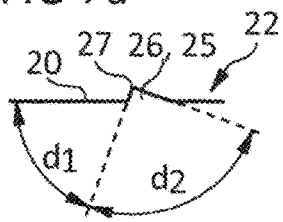
FIGS. 7a-i are cross sectional views of a plate of a crease line pressing tool according to various embodiments.
Figure 7B:
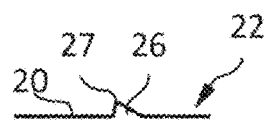
Figure 7C:
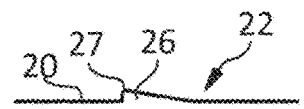
Figure 7D:
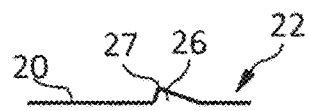
Figure 7E:
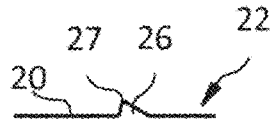
Figure 7F:
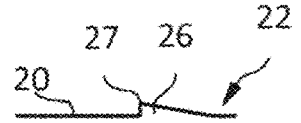
Figure 7G:
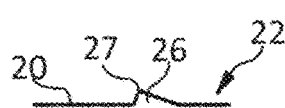
Figure 7H:
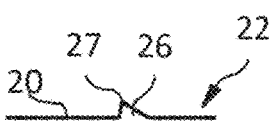
Figure 7I:
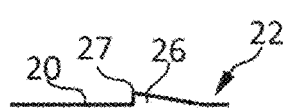

| Embodiment of: | $d_1$ | $d_2$ | $d_3$ (mm) |
| --- | --- | --- | --- |
| FIG. 7a | 70° | 90° | 0.2 |
| FIG. 7b | 80° | 70° | 0.4 |
| FIG. 7c | 90° | 80° | 0.6 |
| FIG. 7d | 70° | 90° | 0.4 |
| FIG. 7e | 80° | 70° | 0.6 |
| FIG. 7f | 90° | 80° | 0.2 |
| FIG. 7g | 70° | 90° | 0.6 |
| FIG. 7h | 80° | 70° | 0.2 |
| FIG. 7i | 90° | 80° | 0.4 |

The embodiments of FIGS. 7a-i could be modified such that the base portions 25 may form part of the planar, or slightly curved surface of the plate 20 of the pressing tool.

For all embodiment described with reference to FIGS. 6 and 7 the ridge 22 is asymmetric, i.e. $d_1 \neq (180-d_2)/2$. This particular configuration has some advantages which will be described further below.

Figure 8A:
FIGS. 8a-b are cross sectional views of a plate of a crease line pressing tool according to further embodiments.
Figure 8B:

In FIGS. 8a-b two embodiments are shown for which the ridge 22 is symmetric along a centre line extending in the normal direction from the plate 20, i.e. $d_1=(180-d_2)/2$. The ridge 22 has a height of approximately 21.5 mm of which the height of the base portion 25 is approximately 20 mm; hence the height of the imprint portion 26 is approximately 1.5 mm. In FIG. 8*a* $d_1=15°$ while the radius of the apex is approximately 0.4 mm. In FIG. 8*b* $d_1=70°$ while the radius of the apex is approximately 0.4 mm. The embodiments of Figs. a-b could be modified such that the base portions 25 may form part of the planar or slightly curved surface of the plate 20 of the pressing tool.

Figure 8C:
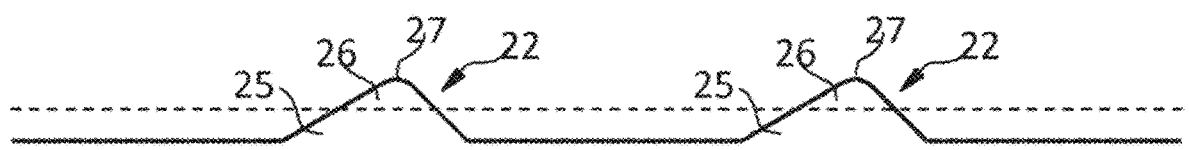
FIG. 8c is a cross sectional view of a plate of a pressing tool according to an embodiment.

FIG. 8*c* shows a further embodiment of the configuration of the ridge 22, including the base portion 25, the imprint portion 26, and the apex 27. The plate 20 is shown to comprise at least two spaced apart ridges 22, each one extending to form a longitudinal structure suitable for providing a crease line to a packaging material. The cross-section of the ridges 22 is triangular, whereby the base portion 25 is formed by the lower part of the ridge 22, i.e. the part being arranged adjacent to the planar surface of the plate 20. The imprint portion 26, i.e. the part of the ridge 22 being in contact with the packaging material 2 during creasing, extends from the base portion 25 to the apex 27.

In order to fully explain the benefits of using the described ridges 22 in a method or system for providing crease lines to a packaging material having a bulk layer some comments will be given on a prior art system using a previously known type of ridge.

Figure 9A:
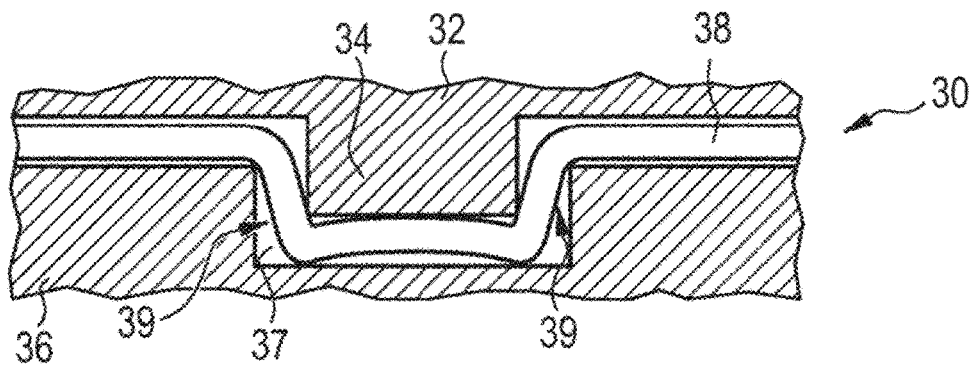
FIG. 9a is a cross sectional view of a prior art system for providing crease lines.

In FIG. 9*a* a part of a prior art system 30 is shown. The system has a press tool 32 with a crease bar 34 in the form of a rectangular profile. The press tool 32 is arranged adjacent to an anvil 36 having a recess 37 for mating with the crease bar 34. During operation a packaging material 38 is arranged between the press tool 32 and the anvil 36, and as the press tool 32 is urged towards the anvil 36 the packaging material 38 will be forced to conform to the shape of the bar/recess interface. Due to the rectangular shape of the crease bar 34, including the vertical sidewalls of an associated imprint portion, the width of the imprint will not increase continuously as the bar is pressed against the anvil. Instead the width of the imprint will be significantly constant throughout the pressing action.

Figure 9B:
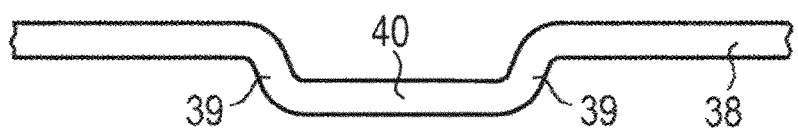
Figure 9C:
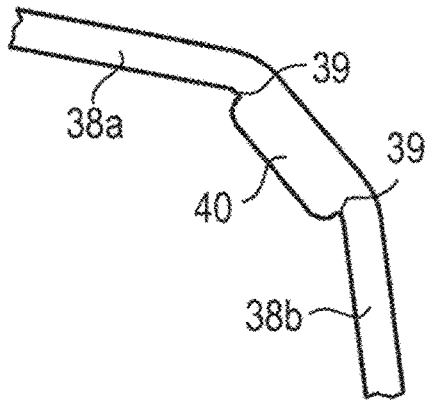
FIGS. 9c-d are cross sectional views of a prior art crease line.
Figure 9D:
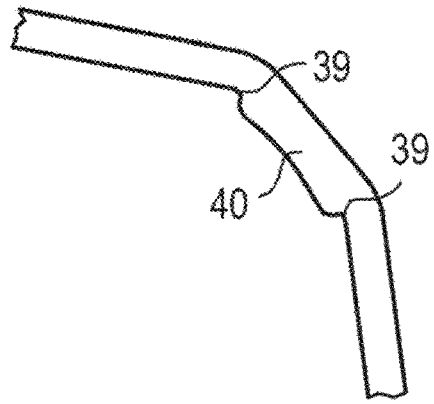

This method of providing crease lines to a packaging material will create two shear fracture initiations 39 in the packaging material at positions corresponding to the positions of the vertical sidewalls of the crease bar 34. The shear fracture initiations 39, in combination with the body of material 40 at the crease line, will reduce the bending resistance locally whereby a large fracture 41 will be formed between the two fracture initiations 39 when the packaging material is subsequently folded. This is shown in FIG. 9*b*, in which the packaging material 38 is illustrated after being provided with crease lines by means of the system 30 shown in FIG. 9*a*. The result of the crease line, i.e. the fracture 41, may be described as a double acting hinge, i.e. a hinge having more than one axis of rotation. In FIG. 9*c* an example is shown of folding along the crease line thus forming a fracture 41. Due to the two shear fracture initiations 39, each of which is forming a rotational axis for folding, the packaging material 38*a* on a first side of the fracture 41 may be folded individually and separately from the packaging material 38*b* on the opposite side of the fracture 41. The crease line 40 will thus give rise to the fracture 41 upon folding, which fracture typically has a width being greater than two times the packaging material thickness, thus allowing for different folding; one further example being shown in FIG. 9*d* in which the packaging material 38 has been folded almost only at the position of one of the shear fracture initiations 39. In this figure the width of the fracture 41 is equal to the distance between the two shear fracture initiations 39. As can be seen, the width of the fracture 41 is more than two times the material thickness after folding.

After folding the fracture 41 thus forms a continuous hinge, or a piano hinge, having a length corresponding to the entire length of the fold. The double action is typically provided by two axes, running in parallel along the entire length and corresponding to the position of the shear initiations 39, around which the fold may occur. In some exceptional cases, there may be formed two smaller fractures beside each other, instead of one large fracture, between the two shear fracture initiations 39. This is not representative for a fold of the prior art crease lines, and if this is observed in measurements, the widths of the two smaller fractures should be summed up and taken as one total fracture width.

Each crease bar/recess will thus give rise to a crease line having two zones of increased stress, by stress meaning induced strain, or shear fracture initiations; the zones extending along the crease line and being separated by a body of material, the width of the body being approximately the same as the width of the bar. The packaging material will thus be folded along two parallel fracture initiation lines placed at a distance from each other. The body of material between the fracture initiation lines/zones turns typically into a larger fracture when folded, which fracture forms a double acting hinge with two axes of rotation. The folding can be symmetric with respect to the two fracture lines or be asymmetric with respect to the one or the other line. Since folding can occur with equal probability at either the one or the other fracture initiation line, circumstances will decide along which line the packaging material will be non-symmetrically folded. Thus, the packaging material may be folded along a first fracture initiation line at some parts of the crease line and then switch over to be folded along the other line and back again, in an unpredictable manner, Such unpredictable and inexact folding will result in a less than desired distinct fold on the folded package. Accordingly, when performing such standard, prior art creasing lines, the weakening effect is to the most part, and almost entirely, accomplished by shear and delamination within the fracture and fracture initiation zones.

Figure 10A:
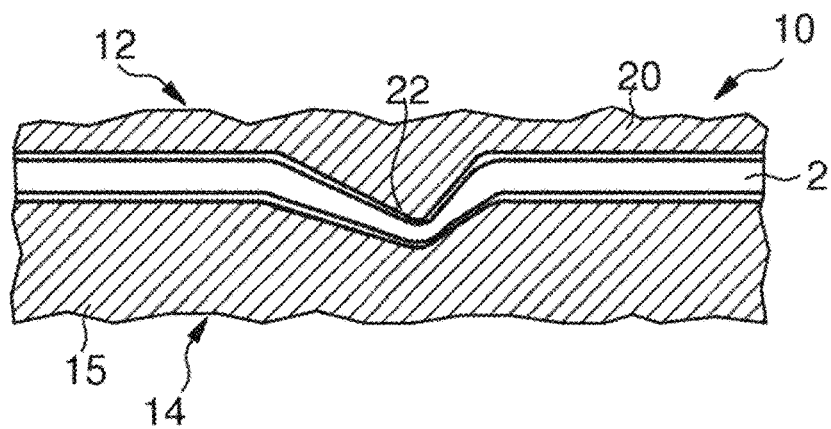
FIG. 10a is a cross sectional view of a system for providing crease lines according to an embodiment.
Figure 10B:
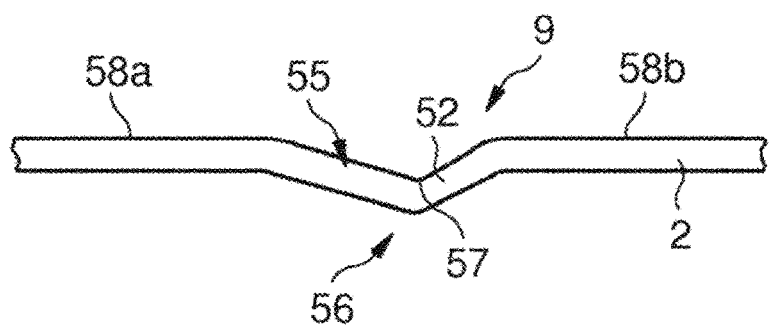
Figure 10C:
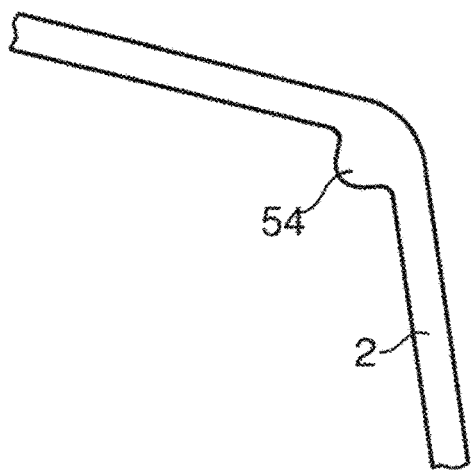
FIGS. 10c is a cross sectional view of a crease line of the packaging material shown in FIG. 10b.

Now turning to FIG. 10*a*-*c* a system 10 according to an embodiment of the present invention is shown. The system 10 comprises a plate 20, either in the form of a planar body used in flat bed punches, or as a slightly curved body conforming to the cylindrical shape of an associated pressing roller. The plate 20 is provided with one or several ridges 22 in accordance with the description above; the ridge 22 is extending in a normal direction, and has a base portion and an imprint portion, wherein the width of the imprint portion is continuously decreasing from the base portion to an apex. The plate forms part of a pressing tool 12. The system 10 further comprises an elastic anvil 14, e.g. in the form of a roller. The anvil 14 is completely covered by the elastic material 15, at least at the areas corresponding to the positions at which the ridges 22 will press against. A piece of packaging material having a bulk layer 2 is arranged between the pressing tool 12 and the anvil 14. The packaging material having a bulk layer 2 is the same as the packaging material 38 of FIGS. 9*a*-*d*.

During operation the packaging material 2 is arranged between the pressing tool 12 and the anvil 14 and as the pressing tool 12 is urged towards the anvil 14 the packaging material 2 will be forced to conform to the shape of the ridge 22. The elastic layer 15 will thus be compressed, or deformed thus allowing the packaging material 2 to change its shape. Due to the triangular shape of the ridge 22, having no or only one vertical sidewall, the width of the imprint will increase continuously as the ridge 22 is pressed against the anvil 14. The imprinted crease line on a packaging material having a bulk layer will thus be formed as an elongated groove having a triangular profile. Each crease line has only a single fracture initiation line, exhibiting induced strain. The bulk layer is fibrous and comprising one or more homogeneous fibre layers. The triangular profile may be evaluated by a Creasy instrument, which is a handheld, camera-based measuring system used to measure and document the dimensions, angles, and symmetry of the crease and bead of packaging material. The instrument is commercially available from Peret/Bobst. The evaluations made in connection with the present invention, by this equipment, were made in accordance with the preliminary user manual version 1.5.9, dated 27 May 2014. The cross section profile of crease lines in the machine direction, i.e. in the direction along with the fibrous bulk layer fibres, was thus evaluated from the outside, i.e. the decor side of the packaging material, which will form the outside of a packaging container manufactured therefrom. Evaluation was thus done on unfolded packaging material, and on crease lines directed along the fibres of the bulk layer. Evaluation was done on un-damaged, straight crease lines, with no print or a uniform print on and around them.

Additionally, the imprinted crease line has a reduced thickness by from 5% to 25%, such as from 10 to 25%, of the un-creased thickness of the packaging material, which is also evaluated by the Creasy instrument.

As seen in FIG. 15a, the crease line of the inventive method has a triangular profile, as compared to the more rectangular profile of the prior art crease method, as shown in FIG. 15b, and as described in connection with FIG. 9. The rectangular profile of the prior art crease line corresponds to a creasing tool having a male ridge 34 and a female groove 37, both rectangular shaped, as shown in FIG. 9a.

The method of providing crease lines according to the invention on a packaging material having a bulk layer will, contrary to the prior art method described with respect to FIG. 9a, create only one significant zone of shear fracture initiation 52 in the packaging material 2 at a position corresponding to the position of a sidewall of the imprint portion, especially when an asymmetric ridge 22 is used (as is shown in FIG. 10a). By having an asymmetric imprint portion of the ridge there will be one particularly well defined area at which shear fracture initiation notably occurs, leading to a very well defined fracture 54 upon folding. By operating the pressing tool 12 the applied force will cause stresses downwards at the side of the packaging material facing the plate 20.

Should a symmetric imprint portion be used a similar effect is seen, i.e. one focused and defined zone of fracture initiation becomes apparent. The symmetric imprint into the packaging material having a bulk layer becomes more severe, however, and the method is critical to control within a narrow window of operation, in order to avoid simply cutting through the material by a symmetrically triangular bar of the press tool. Thus, non-symmetric crease bars provide more well-defined creases and allow a more robust creasing operation. The robustness becomes particularly important when running rotational creasing operations at high rotational speed, such as from 100 m/min and above, such as from 300 m/min and above, such as from 500 m/min and above.

In addition, to the shear fracture initiation, there will be a thickness reduction of the packaging material 2, according to this method, i.e. by the triangular shape of the ridge 22, having no or only one vertical sidewall, and by the width of the imprint increasing continuously as the ridge 22 is pressed against the anvil 14.

The crease lines according to the invention, thus provide a thickness reduction of the imprinted or embossed packaging material, compared to uncreased material, of from about 5% to about 25%, such as from about 10 to about 25%. The typical prior art crease of FIG. 9, will have a thickness reduction at the imprinted crease line lower than 10%, such as lower than 5%, such as no or virtually no thickness reduction of the packaging material at all.

When the packaging material is subsequently folded the fracture initiation 52 will reduce the bending resistance locally, whereby one small fracture 54, in the form of a body of deformed material will be created adjacent to the fracture initiation 52. The small fracture 54 forms a hinge mechanism which due to the limited extension of the imprint width, i.e. the lateral dimension of the cross section of the single folding line, as well as due to the provision of only one shear fracture initiation (or two shear fracture initiations arranged very close to each other), will provide only a single axis of rotation. This is shown in FIG. 10b, in which the packaging material 2 is illustrated after being provided with crease lines 9 by means of the system 10 shown in FIG. 10a. The formed fracture 54, i.e. the formation of the hinge mechanism 54, may be described as a single acting hinge, i.e. a hinge having only one axis of rotation. In FIG. 10c an example is shown of folding along the crease line thus forming the fracture 54.

When folding a flat packaging material of the invention, it can be seen that the hinge mechanism only has a single axis of rotation by means of viewing with a microscope with a magnification of ×50 times, from the outside of the packaging material, i.e. the decor side, i.e the side of the packaging material which will form the outside of a packaging container manufactured therefrom. On an un-damaged and un-folded crease line which is directed in the machine direction, i.e. along the fibre direction of the fibrous bulk layer, it can be seen that there is only one narrow fracture initiation line visible within the crease line, the width of which is indicated as X, as seen in a microscope picture in FIG. 14a. When, on the other hand, a prior art crease line according to FIG. 9, on a similar packaging material is studied, it is clearly seen in the microscope picture of FIG. 14b, that the crease line comprises two fracture initiation lines, which together upon folding form a wider fracture, the width of which is indicated as Y. The crease line should advantageously be studied regarding this feature, in light directed diagonally towards the crease line from two opposite directions. The single and the pair of two fracture initiation lines, per crease line, indicate that there are one and two axes of rotation, respectively. When folding the packaging material, in a folding rig for standardized folding, the presence of one or two rotation points or axes of rotation may be further studied by means of microscope studies at ×50 magnification. As can be seen in FIG. 10c the packaging material has a substantially constant material thickness, except at the location of the fracture 54. The thickness of the fracture and the packaging material, respectively, is the measurement in the z-direction of the packaging material, i.e. the "out-of-plane" direction.

Figure 16:
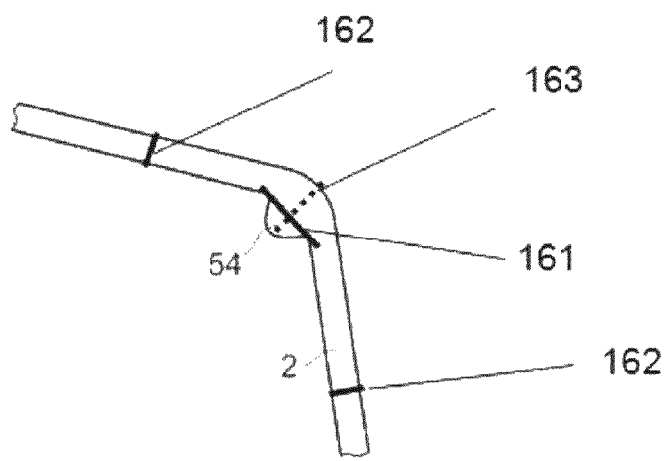
FIG. 16 is the same as FIG. 10c with indications how to measure the width 161 of the fracture 54, the thickness 162 of the packaging material and the thickness 163 of the fracture 54.

The width of the fracture 54, i.e. the lateral dimension of the cross section of the single folding line, will always be less than two times the material thickness after folding. This is always the case, when packaging material comprising a fibrous liquid paperboard is used, comprising one or more homogeneous fibre layers, and in particular the case when the bulk layer has the characteristics of a density higher than 300 kg/m$^3$ and a bending stiffness index of from 6.0 to 24.0 Nm$^6$/kg$^3$, according to method ISO 2493-1 and SCAN-P 29:95 (equivalently 0.5 to 2.0 Nm$^7$/kg$^3$). When measuring the width of the fracture, and the thickness of the non-creased packaging material, care should be taken to measure on un-damaged crease lines, and straight folded edges only (with no print or uniform print on and around the crease line), when folded to an angle of 90 degrees, in a folding rig. The folding should be done with a pure bending moment, to avoid skewed folds. The measurements may be performed using a USB microscope with ×20-×220 magnification. The resulting value should be calculated as an average from a minimum of 20 different measurements on each packaging material type, in order to get a statistically reliable result. For each measurement, a strip sample of flat packaging material is cut at 25 mm by 100 mm, and placed in a folding rig. The measurements are made during folding to 90 degrees. The width of the fracture may be measured on crease lines of all directions on a sample, i.e. in machine (fibre) direction, as well as cross(-fibre) direction. FIG. 16 illustrates how to measure the width 161 of the fracture 54 (in FIG. 10c) and the thickness of the packaging material 162. The thickness of the fracture 54, is also indicated, at 163.

When studying the folded crease lines on a filled and sealed packaging container, X-ray technology may be used, in order to determine the ratio between the width of the fracture and the doubled packaging material thickness. This may be done on crease lines in any direction of a fibrous bulk layer.

Figure 17A:
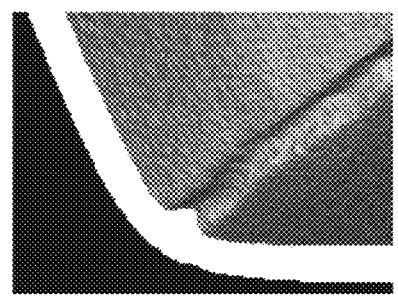
FIG. 17a illustrates undamaged crease lines as they should appear in a microscope view before measurements are done to evaluate them.
Figure 17B:
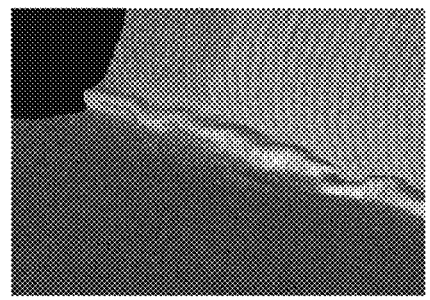
FIG. 17b illustrates damaged crease lines, to be avoided when measuring the properties discussed in this application.

Un-damaged crease lines are straight and folded along one single fracture initiation line, as shown in FIG. 17a, which shows an X-ray picture of a crease line according to the invention in a Tetra Brik® Aspetic package. A damaged such crease line on the other hand, is shown in a corresponding X-ray picture in FIG. 17b, where the folding line is "zig-zag-ing" due to occasional uneven properties in the paperboard or bulk layer, thus leading to a bent and irregular propagation along the folding line. In the illustrated embodiment in FIG. 10c the packaging material is folded approximately 90° for the formation of a sharp, well defined longitudinal outer edge on the finished package with the single folding line facing inwards in the package. The crease line imprint side, is on the outside of the package.

Figure 11:
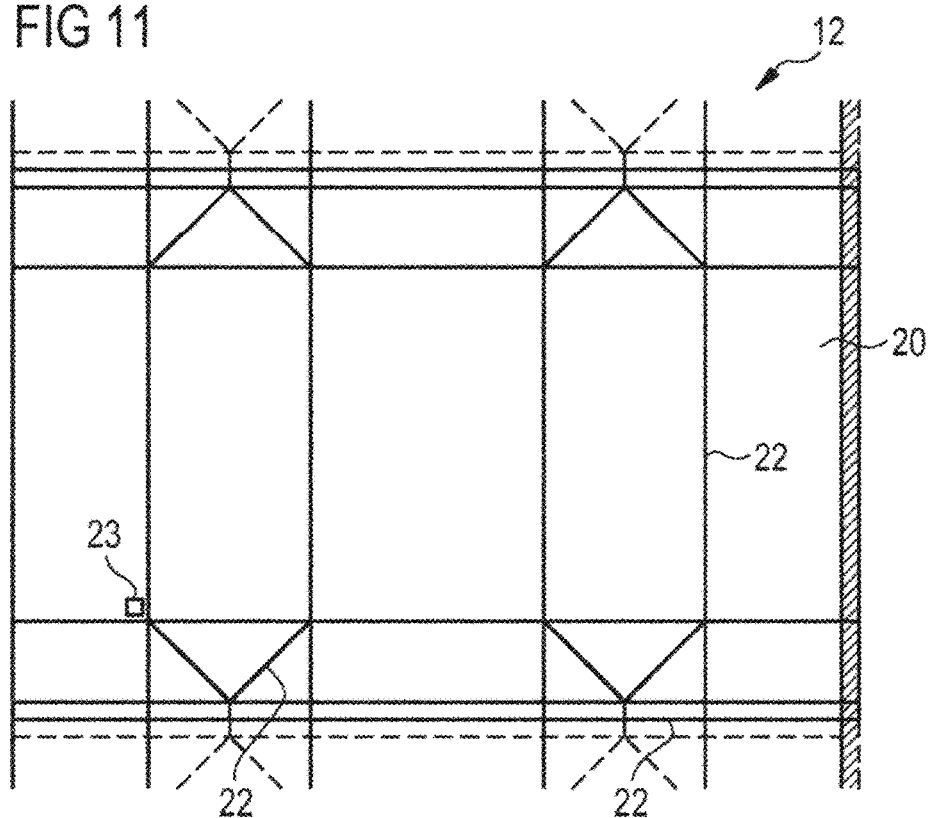
FIG. 11 is a top view of a packaging material for use with a method according to an embodiment.

Now turning to FIG. 11 a further embodiment of a crease line pressing tool 12 is shown. The pressing tool 12 comprises a plate 20 having one or more ridges 22 of the same shape as previously been described. In addition to this, the plate 20 comprises one or more marks 23. Each mark 23 is arranged at a predetermined position in relation to one or more ridges 22, and is configured to be detectable by a sensor unit during further processing of the packaging material such as filling or folding. Hence, each mark is provided for ensuring that the subsequent processing is performed accurately, whereby the position of the mark 23 indirectly determines the position of the crease lines. The marks 23 may e.g. be implemented as optical marks such as bar codes, OR codes, colour codes, etc. In yet further embodiments the marks 23 may be implemented as magnetic recorded marks. By providing the packaging material with a mark 23 having a very specific position relative the creasing tool ridges 22, the exact operation and position of the forming equipment of the filling machine may be accurately determined. Hence, the folding of the packaging material will be exact along the crease lines. The packaging material 2 shown in FIG. 5 comprises such marks 9e, being provided at a fixed position relative the set of crease lines for allowing more precise folding of the package material 2. The higher precision of the crease lines of the invention, in combination with higher precision in position control due to improved marking technology, enable together a more exact and tightly designed crease line pattern, in comparison to prior art crease line patterns for packaging material package repeat lengths. The tolerances within which the crease line positions relative other crease lines and package features can be made smaller and thus the packaging material web or blank may be used more efficiently for the purpose of designing packaging containers of pre-determined volumes. Accordingly, there will be less waste material from edges and corners of package repeat lengths, webs and blanks, and/or the same number of packages may be produced from a reduced amount of packaging material. By moving one or more crease line a few tenths of a millimeter within the package repeat length (i.e. the repeat crease line pattern for the folding of one packaging container unit), slightly modifying an angle here or there in the pattern of the machine and cross direction crease lines, the same package volume may be realised with less material, such as with a narrower web or a shorter blank of packaging material.

Furthermore, the narrower and higher precision crease lines of the invention, consume less of the packaging material web in the machine direction, than prior art crease lines having two fracture initiation zones which delaminate when embossing the packaging material. Thus, the invention crease lines cause less of a "crepping" phenomenon of a packaging material having a fibrous bulk layer. On a web rolled onto a storage reel, such material savings will be notable, even if not directly recognizable on one package repeat length unit or on a shorter part of the web.

Figure 12:
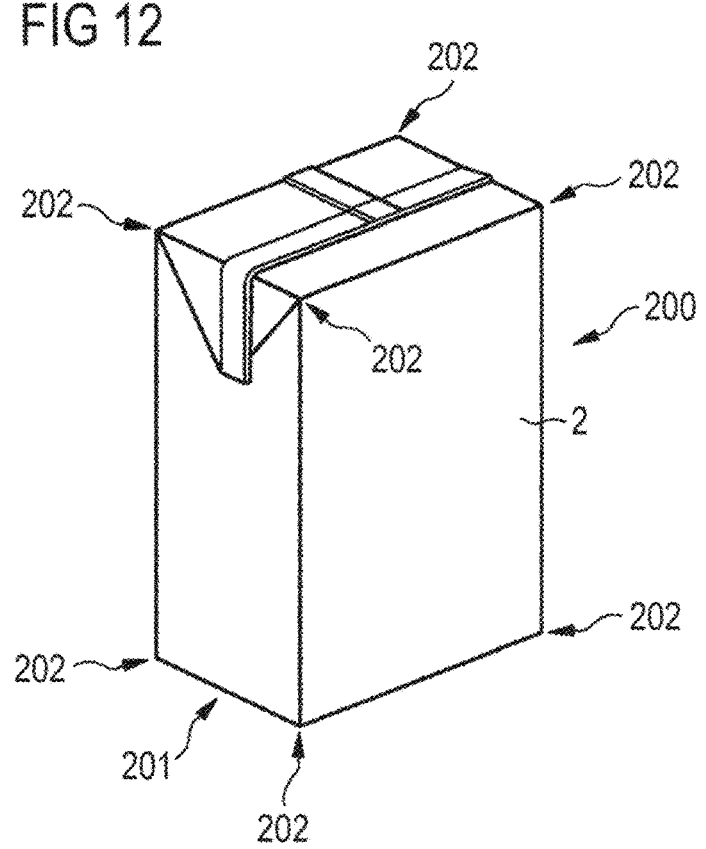
FIG. 12 is an isometric view of a package according to an embodiment.

Now turning to FIG. 12 an example of a package 200 is shown. The package is a sealed package for liquid food, and is manufactured by folding and sealing a packaging material having a bulk layer 2 prepared with crease lines by means of a pressing tool system 10 described above.

The crease lines of the packaging material 2 will provide fold facilitation by the fact that the folding lines will correspond to the actual, and desired, line of folding resulting in well-defined and reproducible package corner shapes. Well-defined package geometries are obtained in a predefined way. The advantages are superior package performance, in terms of dimensional stability properties, e.g. use-ability, stack-ability, top load compression, and grip stiffness. For example, when arranging the packages to be transported on load carriers, they are typically stacked on top of each other in a regular, layer-based pattern. Thus, the containers need to be rigid enough to allow for several layers of filled packages to be stacked in this manner, without top load compression failure in the bottom layer packages.

Additionally, as the crease lines of the package will allow for the folding of corners with higher precision, packages can be formed at reduced material consumption which thereby allows for material savings and environmental benefits. Moreover, the initial material stiffness can be reduced at retained package use-ability owing to the superior package edge stability.

Experiments have been performed in which the compression strength and grip stiffness have been measured for four different packages, all Tetra Brik Aseptic 1 litre packages. The first package was manufactured by a carton-based packaging material with crease lines formed by a pressing tool of which the ridges are rectangular having a width of 0.7 mm. The anvil did not have an elastic surface, but instead recesses having a width of approximately 1.6 mm for receiving the corresponding ridges. Hence, the crease line system used for the carton-based packaging material of the first package corresponds to the system shown in FIG. 9a. The second, third, and fourth packages were manufactured by a carton-based packaging material with different stiffness levels, expressed by bending force and with crease lines formed by a pressing tool of which the ridges are triangular wherein $d_1=90°$, $d_2=75°$, and $d_3=0.2°$. For these packages the anvil did have an elastic surface. Hence, the crease line system used for the carton-based packaging material of the first package corresponds to the system shown in FIG. 10a.

The bending force was registered as a predetermined material parameter.

The compression strength was measured using a top load compression method, applying an increasing force at the upper end of the package and registering the force at which the package collapses. Thus, a static, vertical compressive load is applied to the top of the package (in package height direction) and the load at the point of damage is determined. The point of damage is when a damage is noted to be permanent and with defects not acceptable according to internally set standards.

The grip stiffness was measured using a grip displacement method, applying a force at respective edges of the side walls of the package and measuring the displacement at the edges of the side walls. The force of 14 N was chosen to suit the stiffness range of the paperboards employed in the tested packages.

The measured values were reported as mean values from measurements of 20 packages.

|  | Package #1 | Package #2 | Package #3 | Package #4 |
|---|---|---|---|---|
| Bending force | 260 mN | 260 mN | 220 mN | 190 mN |
| Compression strength | 242 N | 264 N | 243 N | 210 N |
| Grip displacement | 5.3 mm | 3.5 mm | 4.1 mm | 5.3 mm |

From the table above it is evident that the bending force of the packaging material may be reduced if using improved crease lines according to the embodiments described herein, while still providing the same grip stiffness and compression strength as a package being formed by prior art crease lines. Reduced bending force normally also implies reduced grammage, i.e. a material saving.

The proposed system and method for providing crease lines have further proven to be particularly advantageous for corner folding. As can be seen in FIG. 12 the package 200 comprises eight corners 202. Each corner 202 is formed by folding the packaging material having a bulk layer along five intersecting crease lines. The intersection is provided at areas 9d of the packaging material (shown in FIG. 5). The lower four corners 202 are provided for allowing folding of a closed bottom end 201 having a planar shape. The folds extending between two adjacent corners 202 are made along crease lines 9, by which at least one is forming a hinge mechanism 54 having a single axis of rotation. In a preferred embodiment, all crease lines 9 used to form the closed bottom end 201, as well as the opposite upper end, are forming a hinge mechanism 54 having a single axis of rotation.

By providing each intersecting crease line with a triangular shape cross section in accordance with the description above, in particular with reference to FIG. 10a-c, experiments have proven that it is possible to form distinct corners 202 since the sharp apex of the ridges 22 will create a well-defined imprint also at the intersection point. The term intersect thus has the meaning that crease lines are clearly distinguishable by well-defined imprints at, i.e. all the way through, or closely up to, the intersection point. The intersection point is where crease lines intersect or substantially intersect, or essentially extend up towards a point of intersection or junction. If the crease lines do not actually cross each other and intersect as imprinted, they are anyway almost connecting to an intersection-point, such that they upon folding will automatically and easily propagate and then actually intersect, without occurrence of wild creases or imperfect or additional self-emerging creases and without the need of any additional auxiliary creases. By almost connecting to an intersection-point, would then mean essentially connecting by a difference of from a tenth of a millimeter up to a millimeter, in the case of a normal liquid paperboard having homogeneous and fibrous layers, as found on the market today. This is not possible when using prior art crease line systems and methods, for which the rectangular ridge profile will blur the imprint at the intersection, i.e. at the position of the corner. Thus, at the area of the corner folds, it is not possible to create fracture initiations, i.e. crease lines that distinctively intersect, with prior art creasing technology. This is because the crease line intersection area will be compressed and deformed into a flattened "blind spot" by the creasing with rectangular crease bars and recesses, as can be seen in FIG. 18a, showing the corner area of the not yet folded prior art packaging material, intended for a Tetra Brik package. At the corner folds of a Tetra Brik package, there are for example at least four crease lines 180 to be intersected, why the packaging material is rather homogenously deformed in the corner crease line intersection area 181a, which may have a radius of about 3 mm. Consequently, the crease line intersection area in a conventionally creased packaging material will not be able to make use of crease lines or shear fracture initiations to guide the folds in the operation of folding the corners all the way into the corners of the package. This is valid regardless of which side of the packaging material such crease lines are applied on. Preferably, for the best possible corner folds, all of the crease lines to be intersecting should be formed according to the invention, as shown in FIG. 18b, where the same area 181b clearly has well-defined and distinguishable crease lines However, improved corner folds will be obtainable also if only one, or at least one, of the crease lines to intersect forms a fracture when folded which acts as a hinge mechanism having a single axis of rotation. To be able to clearly distinguish whether the corner crease lines do intersect, or just creates a flattened intersection area without guiding lines of weakening, the creased but not yet folded packaging material should be studied. If the packaging material of re-flattened package corners is studied, it may be possible to indicatively deduce the initial arrangement of the crease lines and to recognize the difference in size of the intersection area, but it will be harder to see once the crease lines have been folded and are re-flattened. When studying a creased but not yet folded packaging material, it should preferably have straight and un-damaged crease lines in order to make an accurate determination of intersecting crease lines and the size of the intersection area. Further, there should be no print or a uniform printed decor (colour and/or text) on and around the crease lines. For best possible studies of the intersection point and the intersecting crease lines, the packaging material should be studied and documented by a magnifying camera lens from the imprint side, i.e. from the outside of the packaging material, from the printed decor side, in light directed at 90 degrees angle towards the MD and CD crease lines, respectively. The recommended image acquisition system consists of a camera with a lens, a camera stand and an illumination system with light bars.

FIG. 18c shows an example of the crease lines 180 almost connecting to an intersection-point, such that they will automatically and easily propagate and then actually intersect upon folding, as described above.

Experiments have further proven that folding along poorly defined crease lines will increase the risk of cracks and uncontrolled disintegration of the bulk layer of the packaging material. Hence the system and method according to the present invention will provide improved quality and reliability of the folded packages. An additional advantage is associated with the fact that the crease line 9 provided by means of the pressing tool described above will have a height on the non-imprint side being significantly less than the height on the non-imprint side of prior art crease lines. The deformation of the packaging material is thus reduced in comparison to crease lines of the prior art. During lamination to the inside layer of the packaging material (to be directed inwards in a packaging container), there will consequently be a reduced risk of entrapped air inclusion at the position of the crease lines. Moreover, it has been seen that in packages having better defined and more precisely folded corners, thanks to the creasing method of the invention, less strain is induced on the packaging material at the corner areas, such that the barrier properties of the packaging material around the corner areas will also be improved.

With reference to FIG. 13 a method 300 for providing crease lines to a packaging material having a bulk layer will be described. The method comprises a first step 302 of arranging the material to be creased between an elastic anvil and a pressing tool having at least one protrusive ridge facing the anvil, and a subsequent step 304 of pressing the ridge towards the anvil such that the packaging material will be subject to an imprint. During step 304, the width of the imprint is continuously increasing as the ridge is pressed against the anvil. Step 304 of pressing the ridge towards the anvil may either be performed such that the width of the imprint is increasing symmetrically along a central line of the imprint, or such that the width of the imprint is increasing non-symmetrically along a central line of the imprint Step 302 of arranging the packaging material between the elastic anvil and the pressing tool may be performed either by feeding the packaging material through a nip formed between an elastic anvil roller and a pressing tool roller, e.g. by driving at least one of said rollers, or by operating a flat bed punch.

It will be apparent from the foregoing description that the present invention allows for the production of packages with straight, well-defined folding edges by means of which the package may be given attractive geometric outer configuration which the package maintains throughout its entire service life.

It will be obvious to a person skilled in the art that the present invention is not restricted exclusively to crease lines of a specific geometric orientation. In practice, such crease lines may be oriented in any desired direction and in any desired pattern which is ultimately determined by the desired outer configuration of the finished package. Crease lines according to the present invention can be oriented both transversely and axially on a web of packaging material for obtaining transverse or longitudinal fold-facilitating crease lines, respectively, or diagonal crease lines for obtaining crease lines facilitating folding of e.g. flaps.

Nor is the present invention restricted as regards to the laminate structure of the packaging material. It will be obvious to the skilled reader of this specification that other material layers than those described above may also be employed and may even be preferred over those specifically described above. The ultimate choice of laminate structure and barrier properties in the finished packaging material is determined by the product or type of product which is to be packed in the package produced from the packaging material.

Although the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A packaging material, comprising a laminate having a fibrous bulk layer covered by plastic coatings on each side thereof, said fibrous bulk layer comprising:
   at least one crease line for facilitating folding of the packaging material to a package, the at least one crease line is formed as an imprint on a primary side of said packaging material, and as an embossment on a secondary side of said packaging material, wherein
   said imprint is formed as an elongated groove having a triangular profile,
   said triangular profile is non-symmetrical along a center line extending from a bottom apex in the normal direction of said packaging material,
   said at least one crease line has a reduced thickness of the imprinted or embossed packaging material, compared to uncreased material, by from 5% to 25%, and
   said at least one crease line, to facilitate one folding operation, has only one single fracture initiation line.

2. The packaging material according to claim 1, wherein the fibrous bulk layer has a density higher than 300 kg/m3 and a bending stiffness index of from 6.0 to 24.0 Nm6/kg3, according to method ISO 2493-1 and SCAN-P 29:95 (equivalently 0.5 to 2.0 Nm7/kg3).

3. The packaging material according to claim 1, which when folded is forming a fracture along the at least one crease line, the width of the fracture being less than two times the thickness of the packaging material, calculated as an average of at least 20 different measurements.

4. The packaging material according to claim 1, wherein said primary side of said packaging material is configured to form the interior side of a package.

5. The packaging material according to claim 1, wherein said primary side of said packaging material is configured to form the outer side of a package.

6. The packaging material according to claim 1, comprising a set of crease lines, wherein at least one crease line is oriented in a first direction for forming a longitudinal fold, and wherein at least one crease line is oriented in a second direction for forming a transversal fold.

7. The packaging material according to claim 6, wherein at least one crease line is oriented in a tilted direction relative the first and second directions for forming a diagonal fold corresponding to a corner or a flap of a final package.

8. The packaging material according to claim 1, further comprising at least one area at which an imprint of a first crease line intersects with an imprint of a second crease line.

9. The packaging material according to claim 8, wherein said area is configured to form a corner of a package, and wherein the depth of the imprints at said area is substantially the same as the depth of the imprints at other positions on the packaging material.

10. The packaging material according to claim 1, further comprising a readable mark arranged at a fixed position relative to at least one crease line.

11. The packaging material according to claim 1, wherein the laminate further comprises a barrier layer for preventing diffusion of oxygen through the laminate.

12. The packaging material according to claim 11, wherein the barrier layer comprises aluminum.

13. A continuous web being made of a packaging material according to claim 1.

14. A blank, or a capsule being made of a packaging material according to claim 1.

15. A packaging container, comprising a packaging material according to claim 1 being folded along said at least one crease line.

\* \* \* \* \*